(12) United States Patent
Yasuda et al.

(10) Patent No.: US 10,899,555 B2
(45) Date of Patent: Jan. 26, 2021

(54) CUP-SHAPED CONTAINER CONVEYANCE DEVICE

(71) Applicant: NISSIN FOODS HOLDINGS CO., LTD., Osaka (JP)

(72) Inventors: Shigeru Yasuda, Osaka (JP); Toshikazu Nakashima, Osaka (JP); Hiroaki Hasegawa, Osaka (JP); Masashi Takeda, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 0 days.

(21) Appl. No.: 16/469,045

(22) PCT Filed: Dec. 5, 2017

(86) PCT No.: PCT/JP2017/043584
§ 371 (c)(1),
(2) Date: Jun. 12, 2019

(87) PCT Pub. No.: WO2018/110364
PCT Pub. Date: Jun. 21, 2018

(65) Prior Publication Data
US 2020/0255228 A1     Aug. 13, 2020

(30) Foreign Application Priority Data
Dec. 14, 2016   (JP) .................. 2016-242699

(51) Int. Cl.
*B65G 47/68*     (2006.01)
*B65G 47/244*    (2006.01)
*B65G 47/82*     (2006.01)

(52) U.S. Cl.
CPC ........... *B65G 47/68* (2013.01); *B65G 47/244* (2013.01); *B65G 47/82* (2013.01); *B65G 2201/0235* (2013.01)

(58) Field of Classification Search
CPC .. B65G 47/082; B65G 47/084; B65G 47/086; B65G 47/088; B65G 47/244;
(Continued)

(56) References Cited

U.S. PATENT DOCUMENTS 3,193,079 A * 7/1965 Winter, IV ........... B65G 47/086
                                             198/426
3,253,694 A * 5/1966 Kinney ................ B65G 47/244
                                             198/374
(Continued)

FOREIGN PATENT DOCUMENTS

JP  52-038831 Y2   9/1977
JP  11-147503      6/1999
(Continued)

OTHER PUBLICATIONS

International Search Report issued in International Application No. PCT/JP2017/043584, dated Jan. 16, 2019, 3 pages.
(Continued)

*Primary Examiner* — Mark A Deuble
(74) *Attorney, Agent, or Firm* — Hamre, Schumann, Mueller & Larson, P.C.

(57) ABSTRACT

[Problem] To develop a device for diverting, to multiple conveyance paths, a plurality of cup-shaped containers conveyed in a single file on a manufacturing line, and consolidating a prescribed number of the containers as a group so as to be sequentially and continuously conveyed.
[Solution] The method that has been found to be effective involves providing a plurality of adjacently arranged successive conveyance paths that branch out from a conveyance path of a conveyance device that continuously conveys cup-shaped containers having prescribed shapes in a single file, sequentially conveying the cup-shaped containers on the branch conveyance paths, stopping the movement of the cup-shaped containers and aligning the containers at the end (Continued)

point of the branch conveyance paths, consolidating the containers as a group at the end point in each of the conveyance paths, and transferring the cup-shaped containers to another conveyance path.

12 Claims, 7 Drawing Sheets

(58) Field of Classification Search
CPC .... B65G 47/68; B65G 47/681; B65G 47/682; B65G 47/683; B65G 2201/0235; B65G 2201/0244; B65G 2201/0252
USPC .................................................. 198/426–429
See application file for complete search history.

(56) References Cited

U.S. PATENT DOCUMENTS

| | | | | |
|---|---|---|---|---|
| 4,041,674 | A * | 8/1977 | Reid | B65B 9/02 53/496 |
| 4,067,433 | A * | 1/1978 | Phipps | B65B 35/56 198/374 |
| 9,776,751 | B2 * | 10/2017 | Lukes | B65B 35/24 |
| 10,040,587 | B2 * | 8/2018 | Rapparini | B65B 35/56 |
| 10,399,796 | B2 * | 9/2019 | Bellante | B65B 35/58 |
| 2020/0115171 | A1 * | 4/2020 | Ziegler | B65G 47/681 |

FOREIGN PATENT DOCUMENTS

| | | |
|---|---|---|
| JP | H11-157508 | 6/1999 |
| JP | 2003-002432 | 1/2003 |
| JP | 2008-280082 | 11/2008 |
| JP | 2015-227222 | 12/2015 |

OTHER PUBLICATIONS

Written Opinion of the International Searching Authority issued in International Application No. PCT/JP2017/043584, dated Jan. 16, 2019, 3 pages.

Office Action issued for Japanese Patent Application No. 2016-242699, dated May 19, 2020, 8 pages including English translation.

* cited by examiner

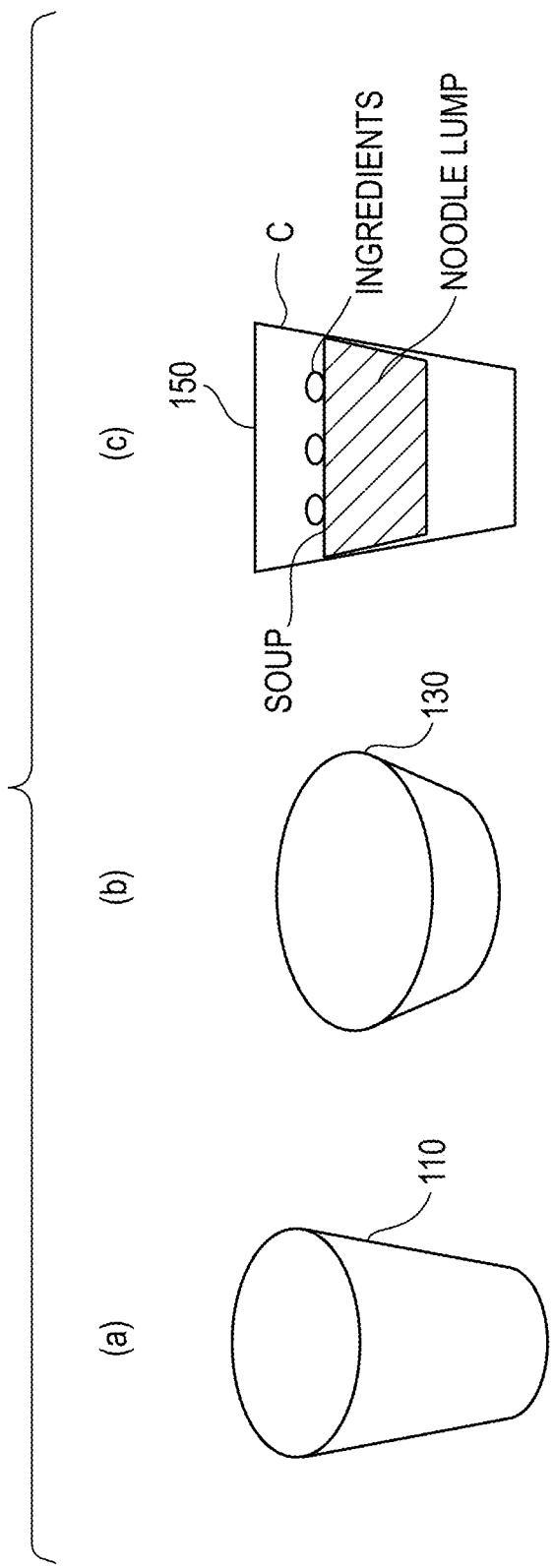

CUP-SHAPED CONTAINER CONVEYANCE DEVICE

TECHNICAL FIELD

The present invention relates to a conveyance device for conveying a plurality of cup-shaped containers as a bundle.

BACKGROUND ART

There are many cases where a plurality of articles (cup-shaped containers) need to be sequentially conveyed and a predetermined number of the cup-shaped containers need to be collected as one bundle of a combination. In those cases, a conveying style is known in which the cup-shaped containers are distributed into a plurality of conveyance paths to be conveyed. For example, a patent literature below is used for the purpose of encasement and the like of a plurality of articles by dividing the plurality of articles into a plurality of strings.

CITATION LIST

Patent Literature

Patent Literature 1: Japanese Utility Model Publication No. 52-38831

However, the patent literature described above only separates and distributes the same types of articles into a plurality of strings, and hence does not assume further conveyance of the group of articles. In addition, at the time of the distribution, the positions of the articles are assumed to be different in the respective strings, and mechanisms for gripping and releasing the articles are expected to be complicated.

DISCLOSURE OF THE INVENTION

Technical Problem

Thus, the inventors of the present invention have intensively studied a method of sequentially conveying a plurality of groups of articles (cup-shaped containers), distributing the articles into a plurality of conveyance paths, and sequentially conveying the group of articles from the conveyance paths into another conveyor as a bundle with a relatively simple configuration.

When the group of articles can be conveyed as a bundle as above, a subsequent step of packaging by wrapping, such as pillow packaging, can be performed in a continuous manner, thereby providing high convenience.

In particular, the inventors of the present invention have aimed to develop a device for sequentially and continuously conveying a plurality of cup-shaped containers, which are conveyed on a manufacturing line in a single string, as a bundle including a predetermined number of cup-shaped containers after distributing the plurality of cup-shaped containers into a plurality of conveyance paths.

Solution to Problem

As a result of the intensive study of the inventors of the present invention, the following method has been found to be effective. In the method, a plurality of conveyance paths diverging from a conveyance path of a conveyance device that continuously conveys cup-shaped containers having a predetermined shape in a single string are successively provided in a side-by-side manner, the cup-shaped containers are sequentially conveyed on the diverging conveyance paths, and the movement of the cup-shaped containers is stopped and the cup-shaped containers are aligned at the end points of the diverging conveyance paths. Then, the plurality of cup-shaped containers at the end point of each conveyance path are transferred to another conveyance path as a bundle.

In other words, a first invention of the present application is "a cup-shaped container conveyance device for conveying a plurality of cup-shaped containers, the cup-shaped container conveyance device including:

(1) a first conveyance device including a conveyance path configured to continuously convey the cup-shaped containers having a predetermined shape;

(2) a second conveyance device including a plurality of conveyance paths diverging from the conveyance path of the first conveyance device, the plurality of conveyance paths being arranged in a side-by-side manner;

(3) a conveyance stopper provided in a terminal end of each of the conveyance paths of the second conveyance device;

(4) a transfer device configured to transfer a predetermined number of the cup-shaped containers stopped by the conveyance stopper of each conveyance path of the second conveyance device as a bundle; and (5) a third conveyance device including a conveyance path configured to convey the predetermined number of cup-shaped containers transferred as the bundle in a single string."

Next, in the invention of the application, the cup-shaped containers are preferably brought into closer contact with each other by removing a partition for each of a predetermined number of conveyance paths in the middle of the conveyance paths of the second conveyance device and conveying the cup-shaped containers downstream.

In other words, a second invention of the present application is "the cup-shaped container conveyance device according to claim 1 wherein a partition for each of a predetermined number of the conveyance paths is removed in middle of the conveyance paths of the second conveyance device."

Next, in the invention of the application, the plurality of cup-shaped containers can be compact when the plurality of cup-shaped containers are consolidated as a bundle by a combination of upright and inverted containers, and hence a device that turns over the cup-shaped containers on any of the diverging conveyance paths is preferably included.

In other words, a third invention of the present application is "the cup-shaped container conveyance device according to claim 1 or 2, further including a turning over device configured to turn over the cup-shaped containers on a predetermined conveyance path out of the plurality of conveyance paths of the second conveyance device".

As described above, in the present invention, the predetermined number of cup-shaped containers transferred as the bundle are arranged such that an upright container and an inverted container alternate in arrangement of adjacent cup-shaped containers.

In other words, a fourth invention of the present application is "the cup-shaped container conveyance device according to any one of claims 1 to 3, wherein the predetermined number of cup-shaped containers transferred as the bundle are arranged such that an upright container and an inverted container alternate in arrangement of adjacent cup-shaped containers."

Next, in the present invention, an ascending and descending stopper device that blocks the conveyance paths is preferably provided in order to align the positions of the cup-shaped containers that are being conveyed at predetermined positions on the upstream side with respect to ascending and descending stoppers at the end points of the conveyance paths in the second conveyance device.

In other words, a fifth invention of the present application is "the cup-shaped container conveyance device according to any one of claims 1 to 4, further including a shutter mechanism capable of ascending and descending for defining a position of each of the cup-shaped containers in each of the conveyance paths in the second conveyance device at a predetermined position on an upstream side with respect to the conveyance stopper."

Next, the present invention may include a packaging device that packages a bundle of a group of cup-shaped containers that has been transferred as a bundle.

In other words, a sixth invention of the present application is "the cup-shaped container conveyance device according to any one of claims 1 to 5, further including a packaging device configured to package the predetermined number of cup-shaped containers as the bundle on a downstream side of the third conveyance device."

Advantageous Effects of Invention

According to the present invention, the plurality of groups of articles (cup-shaped containers) can be sequentially conveyed, the articles can be distributed into the plurality of conveyance paths, and the group of articles from each conveyance path can be sequentially conveyed into another conveyor as a bundle with the relatively simple configuration.

BRIEF DESCRIPTION OF DRAWINGS

FIG. 7 is a front view of the cup-shaped container illustrating an example of the cup-shaped container that can be used in the invention of the application.

Figure 1:
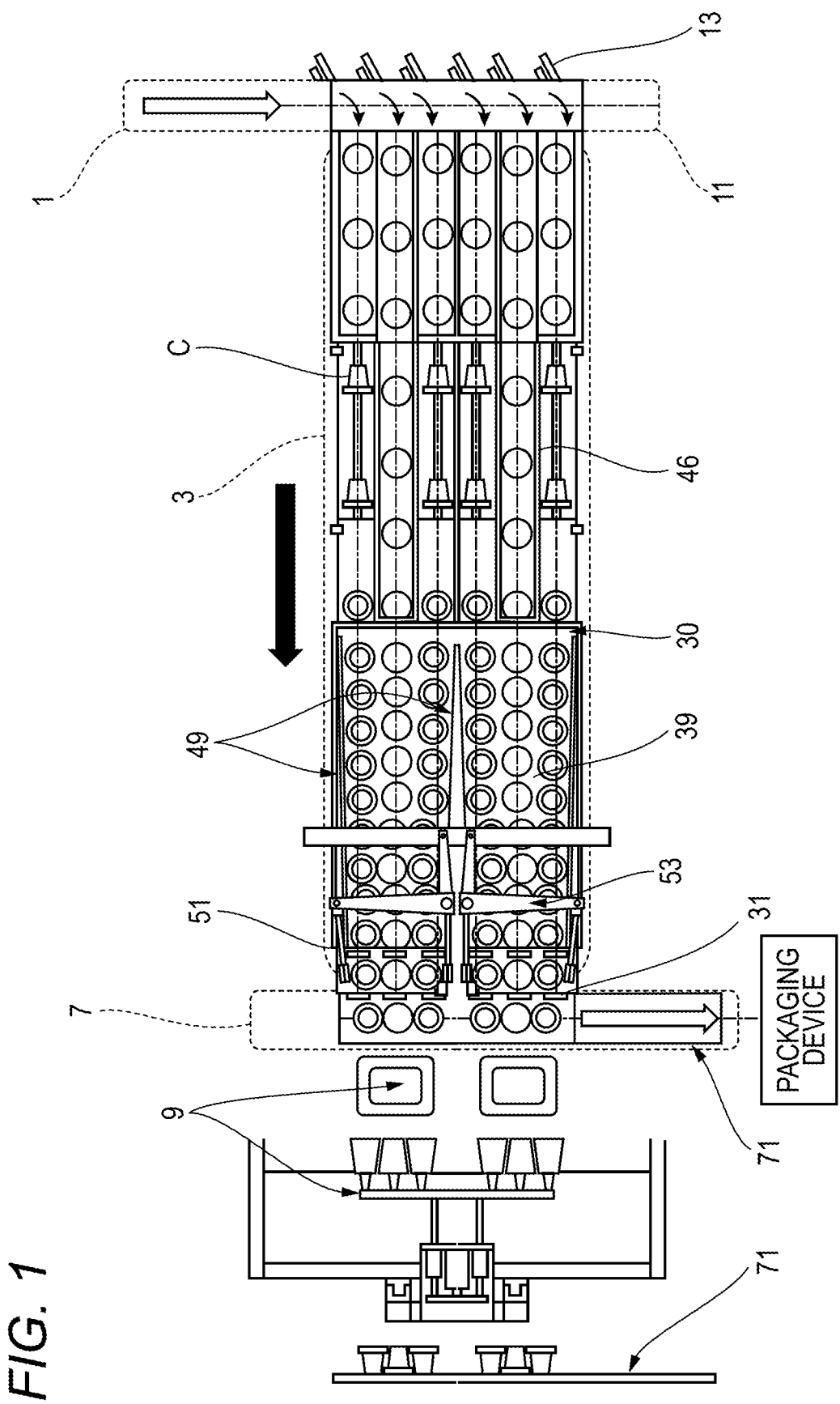
FIG. 1 is a plan view illustrating the entire configuration of a cup-shaped container conveyance device of Embodiment 1 of the present invention. Note that a front view of a transportation device when seen from the upstream side to the downstream side is also illustrated.

REFERENCE SIGNS LIST 1 first conveyance device
11 first conveyance path
13 air device
3 second conveyance device
30 second conveyance path
31 conveyance stopper
35 upright conveyance conveyor
37 downslope conveyor
39 slip-torque conveyor
41 upright conveyance belt conveyor
43 downslope belt conveyor
45 upslope belt conveyor
47 horizontal belt conveyor
49 partition bar
51 first shutter
53 guiding arm
55 cup holding unit
57 first slip region
59 second slip region
7 third conveyance device
71 third conveyance path
9 transportation mechanism
95 transfer unit
97 slider
99 slider rail
110 vertically-long-shaped container
130 bowl-shaped container
150 container (product form) in state in which upper portion is closed
C cup-shaped container

DESCRIPTION OF EMBODIMENTS

Embodiment 1 of the present invention is described below with reference to the drawings. However, as a matter of course, the present invention is not limited to this embodiment.

FIG. 1 is a plan view illustrating the entire configuration of a cup-shaped container conveyance device of the present application. In this embodiment, a type of cup-shaped container conveyance device is described in which three containers including inverted, upright, and inverted containers in combination are consolidated as a bundle.

Figure 2:
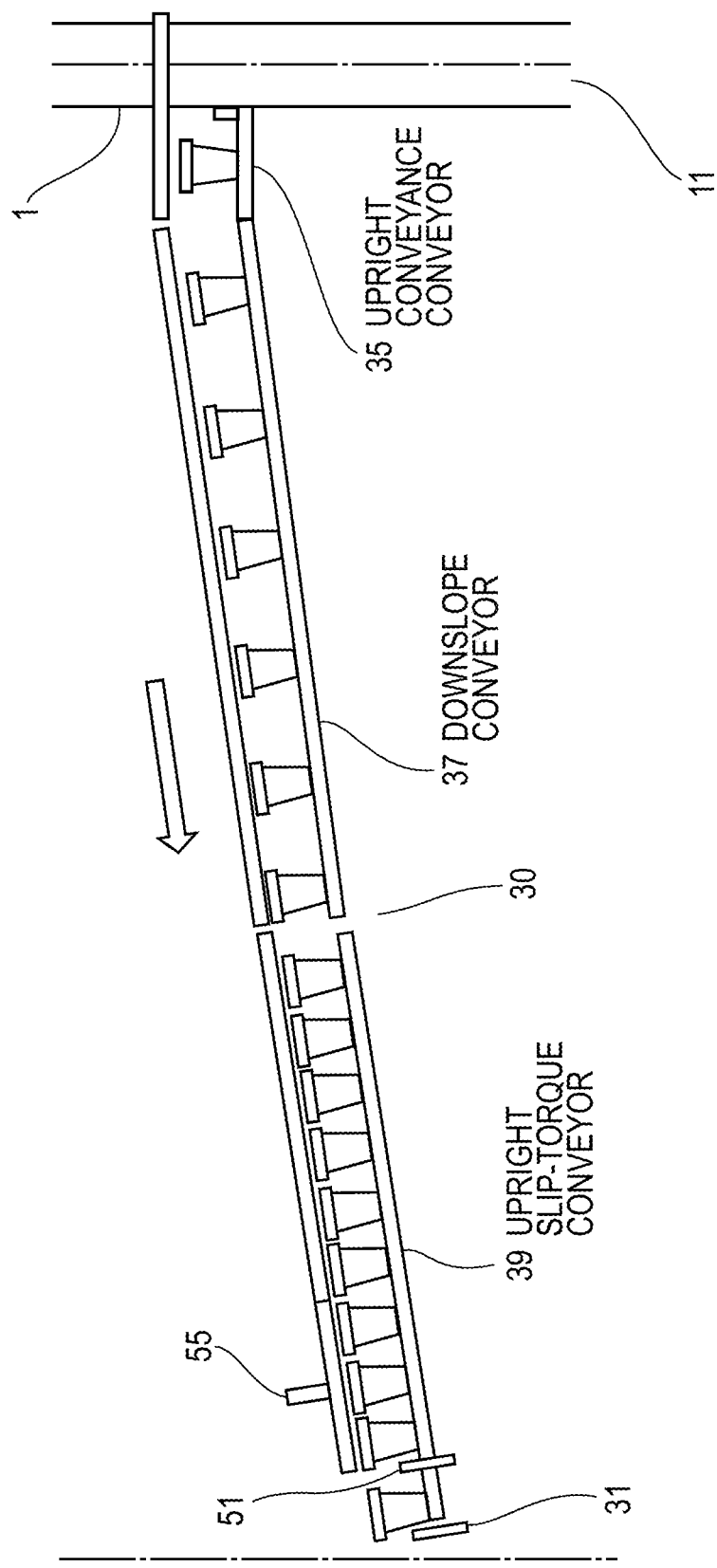
FIG. 2 is a front view illustrating a conveyance paths for a second conveyance path and a fifth conveyance path of a second conveyance device in Embodiment 1 of the present invention that perform conveyance while maintaining an upright state.

FIG. 2 illustrates an example of a conveyance path that performs conveyance while maintaining an upright state in a predetermined conveyance path of a second conveyance device.

Figure 3:
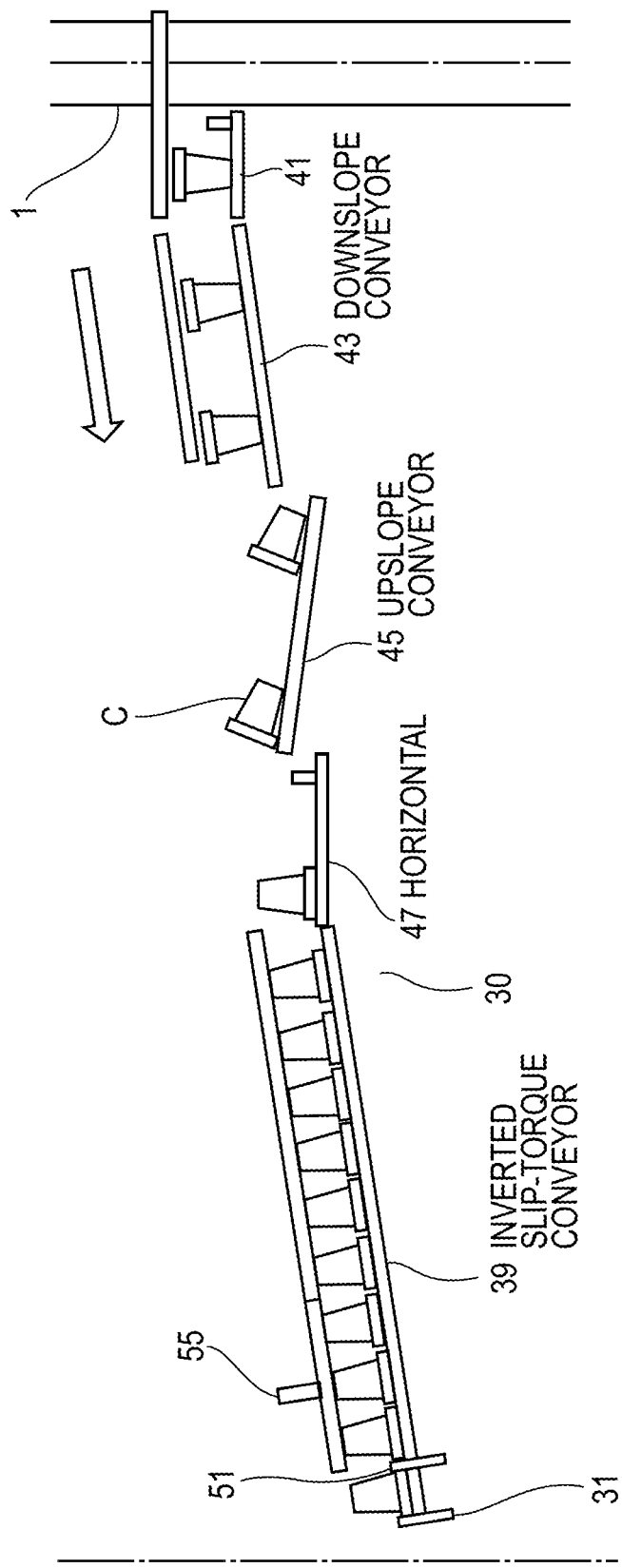
FIG. 3 is a front view illustrating a conveyance path for a first conveyance path, a third conveyance path, a fourth conveyance path, and a sixth conveyance path of the second conveyance device in Embodiment 1 of the present invention that convey cup-shaped containers in an inverted state by turning over the conveyed cup-shaped containers from an upright state.

FIG. 3 illustrates an example of a conveyance path that conveys cup-shaped containers that are conveyed in an inverted state by being turning over from the upright state in a predetermined conveyance path of the second conveyance device.

Figure 4:
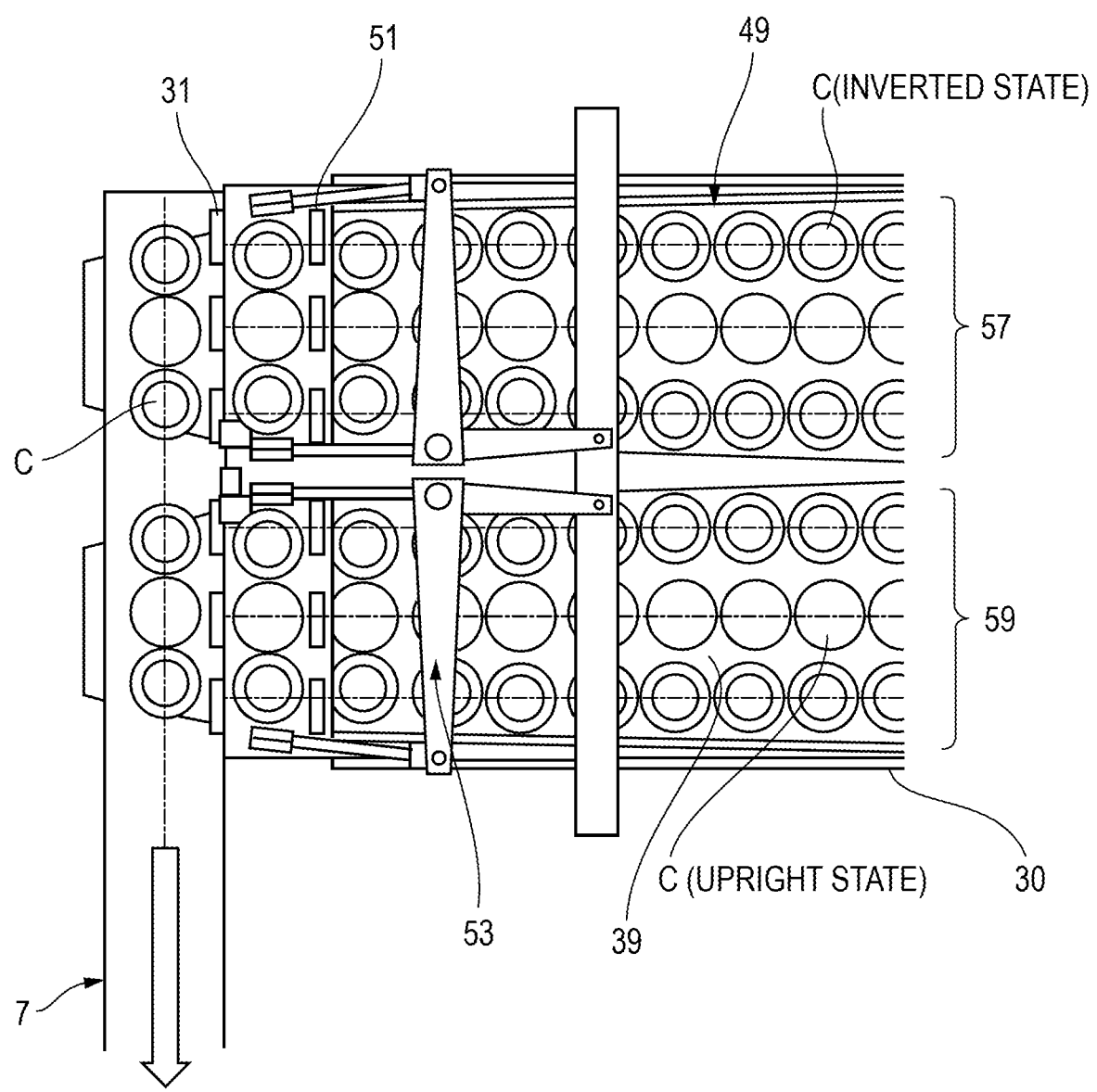
FIG. 4 is a plan view illustrating a downstream portion of the second conveyance path in Embodiment 1 of the present invention.

FIG. 4 illustrates a mechanism in which the cup-shaped containers in a plurality of strings stopped by conveyance stoppers at a terminal end of the second conveyance device in a downstream portion of a second conveyance path is guided from both sides so as to obtain an arrangement in which cup-shaped containers for three meals are in close contact with each other.

Figure 5:
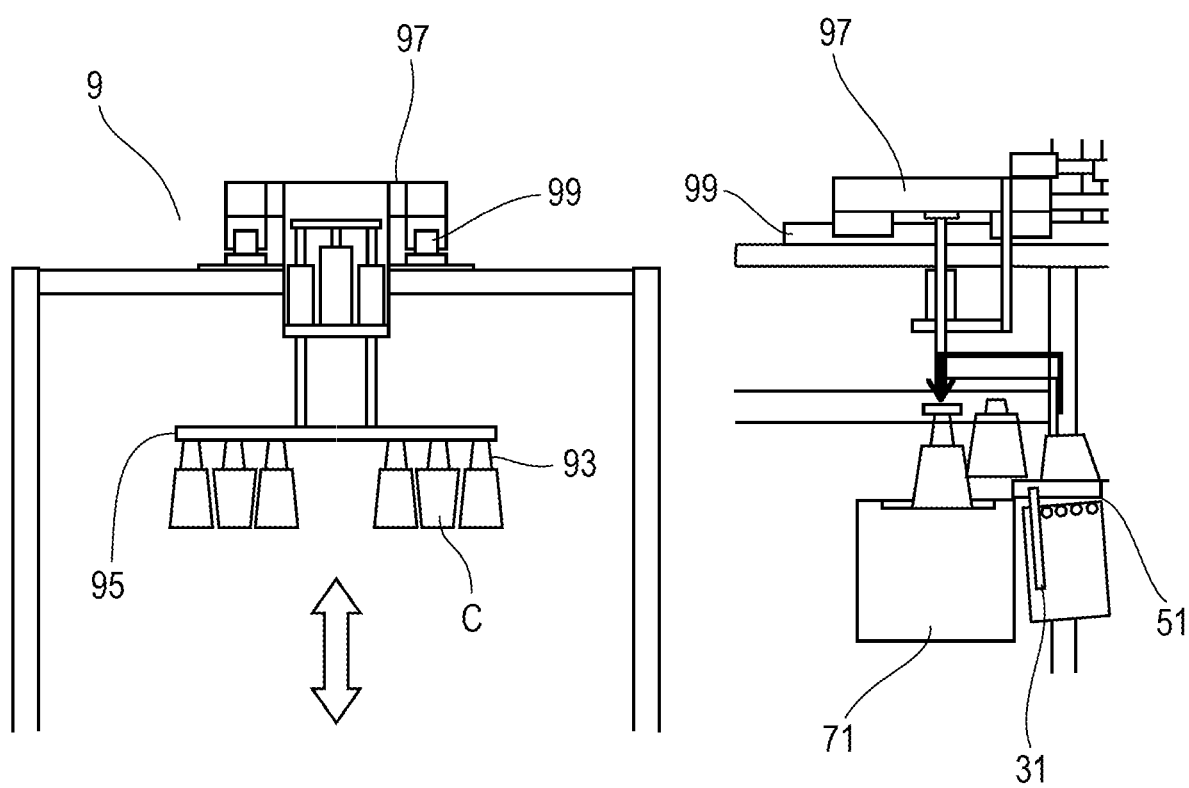
FIG. 5 is a front view illustrating a transportation device in Embodiment 1 of the present invention and is a front view illustrating a mechanism of transferring cup-shaped containers for three meals that are a bundle of inverted, upright, and inverted containers.

FIG. 5 illustrates a mechanism that transfers a group of the cup-shaped containers for three meals in close contact with each other as a bundle.

Figure 6:
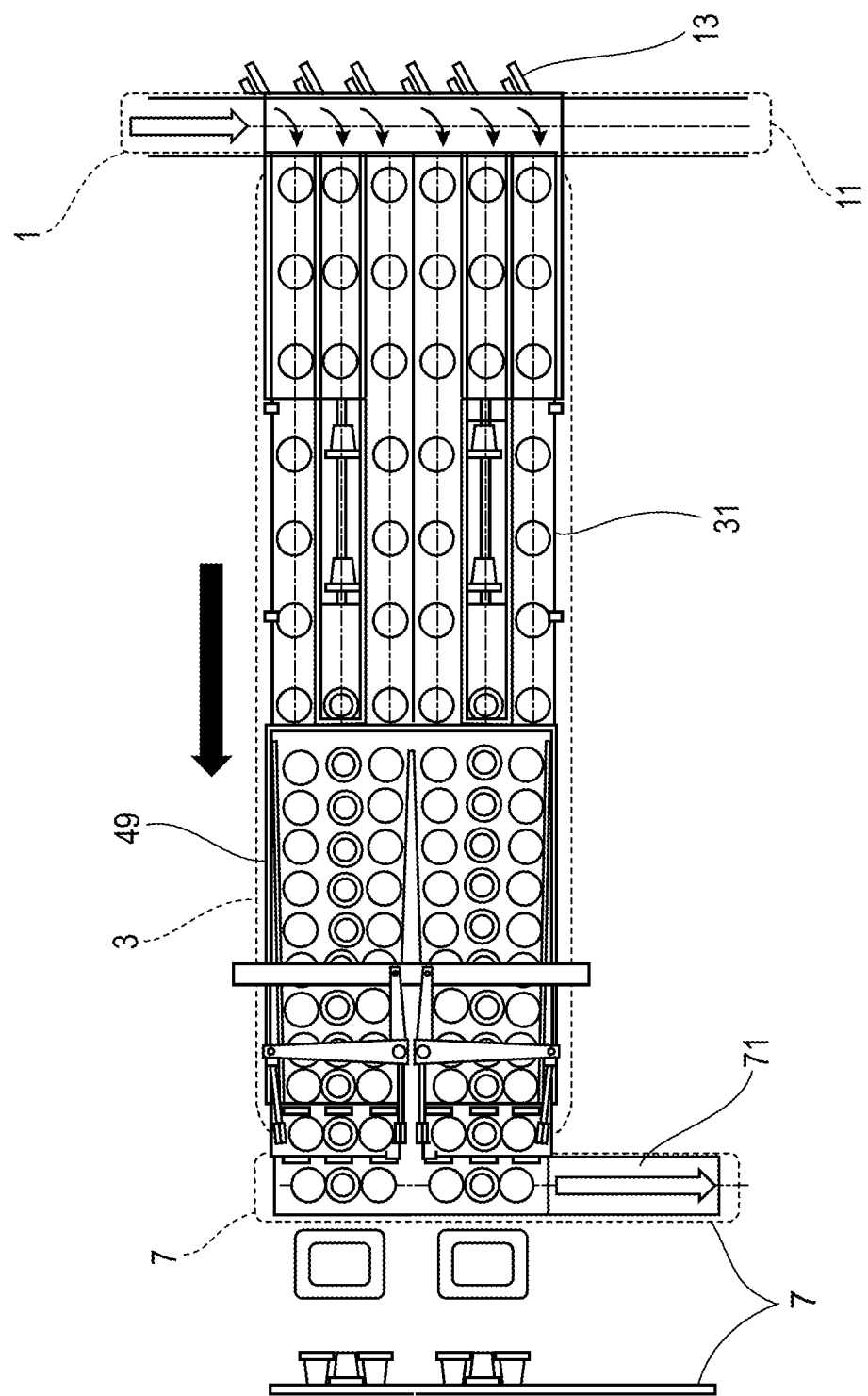
FIG. 6 illustrates a type of a cup-shaped container conveyance device in which three cup-shaped containers are a bundle and a combination of upright, inverted, and upright containers is a bundle as another embodiment of the invention of the application.

Note that the conveyance mode of the cup-shaped containers in the second conveyance device of the present invention is merely one embodiment. In other words, for example, as illustrated in FIG. 6, another embodiment of the invention of the application describes a type of cup-shaped container conveyance device in which three containers including upright, inverted, and upright containers in combination are consolidated as a bundle. As a matter of course, types as the above are possible.

The conveyance paths of the cup-shaped containers according to the present invention are described below along the conveyance of the cup-shaped container.

Note that, in the description of the present invention, the term "upstream to downstream" is used so as to be toward the conveyance direction of a first conveyance device, the second conveyance device, and a third conveyance device.

First, Embodiment 1 illustrated in FIG. 1 is described.

Entire Configuration

As illustrated in FIG. 1, the cup-shaped container conveyance device of Embodiment 1 of the present invention includes a first conveyance device 1 including a conveyance path that sequentially conveys cup-shaped containers C having a predetermined shape in a single string, a second conveyance device 3 including a plurality of conveyance paths diverging from a conveyance path 11 of the first conveyance device, the plurality of conveyance paths being arranged in a side-by-side manner, conveyance stoppers 31 included at terminal ends of the conveyance paths of the second conveyance device 3, a transfer device 9 that transfers a predetermined number of the cup-shaped containers C stopped by the conveyance stoppers 31 of the conveyance paths of the second conveyance device 3 by consolidating the cup-shaped containers C as a bundle, and a third conveyance device 7 including a conveyance path 71 that conveys the predetermined number of cup-shaped containers transferred as the bundle in a single string.

Application Object (Conveyed Article) of Present Invention

Various types of containers can be applied as the cup-shaped container C on the conveyance device of the present invention. However, in order to easily implement the upright or inverted state and the turned over state, the cup-shaped container C using a material with a certain degree of flexibility (paper, plastic, and the like) can be suitably used.

Note that the cup-shaped container in the present invention is preferably a storage container of which opening portion is circular and have a tapered shape. The weight is not particularly defined, but a cup-shaped container roughly within the range of from about 50 grams to about 300 grams is preferred.

In addition, either of a vertically-long-shaped container 110(a) having a tapered shape and a bowl-shaped container 130(b) as illustrated in FIG. 7 can be used as the cup-shaped container in the present invention, but the cup-shaped container in the present invention can be particularly applied to a vertically-long-shaped container 110 in a suitable manner.

Further, the cup-shaped container C can be suitably used for a container (product form) 150. The container 150 stores a predetermined article therein and is in a state in which an upper portion thereof is closed.

In other words, the cup-shaped container in the present invention can be suitably applied to a cup-shaped container (c) in a product form in which articles including dried food, such as a noodle lump, soup, and ingredients, are stored in the cup-shaped container, and the upper portion is sealed by a cap and the like.

More specifically, instant cup noodles and instant cup soup in a cup-shaped container, snacks in a cup, and the like correspond to the cup-shaped container. In addition, as a matter of course, the cup-shaped container in the product form may be already packaged by a shrink film and the like.

First Conveyance Device

The first conveyance device 1 is a device that sequentially conveys the cup-shaped containers C. In Embodiment 1 of the present invention, the cup-shaped containers C are continuously conveyed in a single string along the first conveyance path 11. In FIG. 1, the cup-shaped containers are continuously conveyed in an upright state. However, as a matter of course, the cup-shaped containers are not limited the above, and may be continuously conveyed in an inverted state or a state in which a lateral side portion is in contact with the ground (rolled over state).

In addition, in the first conveyance device 1 in FIG. 1, a conveyance mode by a conveyor is illustrated, but the type of the conveyor is not particularly limited. In addition, not only the conveyor, but a configuration in which a movable unit moves on. a conveyance rail provided on the conveyance path, for example, is also possible.

Second Conveyance Device

Various methods can be employed for the transfer from the first conveyance path 11 to second conveyance paths 30. In the transfer from the first conveyance path 11 to the second conveyance paths 30, transition to the second conveyance paths 30 is implemented by a pressing force of air (air device 13).

In addition, a plurality of predetermined pushers may be provided, and the cup-shaped containers C may be transported to the second conveyance device 3 by pushing out the cup-shaped containers C by a pressing force due to contact.

In Embodiment 1 of the present application, six lanes are provided so as to be adjacent to each other in the second conveyance device 3. On the upstream side of the second conveyance device 3, a belt conveyor is installed on each lane, thereby implementing the conveyance of the cup-shaped containers C.

Further, out of the conveyance lanes, a second lane and a fifth lane from the upstream side to the downstream side of the first conveyance device 1 (in the order from the upper side to the lower side in FIG. 1) are configured to convey the cup-shaped containers so as to maintain the cup-shaped containers in an upright state.

In addition, a first lane, a third lane, a fourth lane, and a sixth lane are configured in such a manner that the cup-shaped containers are sequentially transferred from one short conveyor to another so as to be turned over from an upright state to an inverted state.

First, in the second lane and the fifth lane of the second conveyance device illustrated in FIG. 1, the conveyance paths are provided in a direction intersecting with the conveyance path 11 of the first conveyance device 1 by roughly 90 degrees, belt conveyors and slip-torque conveyors (roller conveyors) are arranged on the conveyance paths, and the cup-shaped containers are conveyed in an upright state (FIG. 2).

First, an upright conveyance belt conveyor 35 is placed at an introduction portion, and a belt conveyor 37 is placed along the downslope so as to be continuous with the belt conveyor.

Next, a slip-torque conveyor 39 is arranged so as to follow the downslope belt conveyor. In the region of the slip-torque conveyor 39, partitions on the conveyance paths are removed in the first to third lanes and the fourth to sixth lanes, and the cup-shaped containers in the respective strings are able to come into close contact with each other while the cup-shaped containers C are being conveyed in the downstream direction.

In addition, as illustrated in FIG. 2, the cup containers are sequentially conveyed at roughly regular intervals in the regions of the belt conveyors described above, but the cup-shaped containers are gradually conveyed in the downstream direction in a retainable state in the region of the slip-torque conveyor 39.

Next, an upright conveyance belt conveyor 41 is placed on the first lane, the third lane, the fourth lane, and the sixth lane, specifically, on the introduction portion. The cup-shaped containers are conveyed by a downslope belt conveyor 43 in a short region after the belt conveyor 41. Then, the cup-shaped containers are rolled over so that the lateral side portions thereof become the ground contact surfaces, and are transferred to an upslope belt conveyor 45. After the transfer, the cup-shaped containers are conveyed on the upslope in a state in which the lateral side portions thereof are in contact with the ground.

After the conveyance on the upslope, the cup-shaped containers C are further inverted, that is, turned over so that the upper surface portions of the cup-shaped containers become the ground contact surfaces, and fall onto a horizontal belt conveyor 47 below the upslope.

On the horizontal belt conveyor 47, the cup-shaped containers in the inverted state are transferred to the slip-torque conveyor 39 while maintaining the inverted state and are gradually conveyed in the left direction and in a state in which the cup-shaped containers C are retainable.

As described above, as illustrated in FIG. 1, the partition for each of the predetermined number of conveyance paths is removed in the middle of the conveyance paths 30 of the second conveyance device 3. In other words, for the conveyed cup-shaped containers C in each lane group, that is, the first lane to the third lane and the fourth lane to the sixth lane described above, the partitions between the lanes are removed on the slip-torque conveyor 39, and the conveyed cup-shaped containers C are gradually conveyed in the downstream direction in two sets of three strings.

Partition bars 49 that partition the first lane to the third lane and the fourth lane to the sixth lane from each other are disposed above the slip-torque conveyor 39 so as to decrease in width toward the downstream direction. The cup-shaped containers C in the first lane to the third lane or the fourth lane to the sixth lane gradually come into close contact with each other, and approach a state of being integrated into a bundle of a set of inverted, upright, and inverted containers (FIG. 4). In addition, the conveyance stoppers 31 are provided on the terminal end portion of the slip-torque conveyor 39.

When the cup-shaped containers C are conveyed to the conveyance stoppers 31 serving as the downstream terminal end portion of the slip-torque conveyor 39, the cup-shaped containers C come into close contact with each other so that the bundle of a set of inverted, upright, and inverted containers is integrated as illustrated in FIG. 4.

Further, first shutters 51 are configured to ascend and descend in a direction substantially perpendicular to the direction of travel of the slip-torque conveyor at a position behind the terminal end (the conveyance stoppers 31) of the slip-torque conveyor 39 by one cup-shaped container.

When the first shutters 51 ascend, a bundle of inverted, upright, and inverted cup-shaped containers is partitioned between the conveyance stoppers 31 provided on the terminal end of the slip-torque conveyor 39 and the first shutters 51, and the longitudinal positions in the conveyance direction of the second conveyance path are adjusted to match each other.

Further, the inverted cup-shaped containers in the bundle of set of inverted, upright, and inverted containers are pressed from both ends by guiding arms 53 at both end portions of the bundle of cup-shaped containers so that inverted, upright, and inverted containers in the bundle completely come into close contact with each other.

In addition, although not shown in FIG. 4, a cup holding unit 55 for pressing the cup-shaped containers C from above may be mounted in order to restrict the positions of the cup-shaped containers as illustrated in FIG. 2 and FIG. 3.

In addition, as a method of reducing the gap between the cup containers is not limited to the above. For example, a frame body that restricts the position of a bundle of inverted, upright, and inverted containers may be mounted on the terminal end of the second conveyance device 3, and a state in which the gaps are small may be completed for the bundle of "inverted, upright, and inverted containers" at the same time as the first shutters ascend.

In addition, as a matter of course, also for the slip-torque conveyor 39, in the rotation of rollers of the conveyor, control of reducing or stopping the rotation, for example, may be performed near the positions of the conveyance stoppers 31.

As described above, various methods can be used as a method of restricting the position of the bundle of cup-shaped containers C.

Transfer Device

In Embodiment 1 of the present invention, at the lower end of the conveyance path of the second conveyance device 3, a transfer device 9 including a transfer unit 95 including suction pads that attract and suck the cup containers from above approaches the set of cup-shaped containers formed to be a bundle of a set of inverted, upright, and inverted containers, and the set of cup-shaped containers is transferred to the third conveyance device while maintaining the state in which the inverted, upright, and inverted containers are integrated.

The transfer device 9 is configured to transfer two bundles of three cup-shaped containers in each of the first lane to the third lane and the fourth lane to the sixth lane, and includes the transfer unit including two sets of three attraction pads corresponding to the respective positions of the (three) cup-shaped containers in a bundle.

The transfer unit 95 has a configuration capable of being vertically raised and lowered and is mounted on a slider 97. The transfer unit 95 is configured to be able to longitudinally move on predetermined slider rails 99 in the conveyance direction of the second conveyance path.

Further, at the terminal end of the conveyance path in the second conveyance device 3, the bundle of cup-shaped containers stopped by the conveyance stoppers 31 is sucked and raised. Then, the slider 97 horizontally moves to the lower portion of the third conveyance device. Then, the transfer unit is lowered and the suction of the cup-shaped container is released in a state in which the cup-shaped containers are placed on the conveyance path of the third conveyance device 7, thereby transferring the bundle of (three) cup-shaped containers to the third conveyance device 7.

Note that the transfer from the second conveyance device 3 to the third conveyance device 7 is not limited to the method using the transfer unit and the like including suction pads 93 described above, and various methods other than the above can also be used.

For example, the following aspect is possible. The conveyance stoppers 31 are configured to be able to ascend and descend in the vertical direction (second shutter device). The (three) cup-shaped containers in a bundle are placed without gaps therebetween by adjusting the positions of the containers by the first shutters, guiding, or the like in a state in which the bundle is stopped by the conveyance stoppers 31. Then, the conveyance stoppers 31 descend, and the bundle is pushed out to the third conveyance path and is transferred.

Third Conveyance Device

In Embodiment 1 of the present invention, the third conveyance device is configured in such a manner that the set of cup-shaped containers, that is, the bundle of a set of inverted, upright, and inverted containers is sequentially conveyed for predetermined processing, such as packaging.

Various processing is possible after the conveyance by the third conveyance device 7. For example, as a matter of course, after the conveyance to the third conveyance device 7, the processing may directly transition to lateral pillow packaging so as to obtain a three meal pack, or a bundle of a set of upright, inverted, and upright containers may be stored into various containers made of cardboard and the like as the bundle.

Note that the abovementioned bundle of upright, inverted, and upright containers is merely an example, and other methods are possible as a matter of course.

Other Modifications

Next, in Embodiment 2 illustrated in FIG. 6, out of Embodiment 1 described above, the first lane, the third lane, the fourth lane, and the sixth lane are configured to convey the cup-shaped containers in an upright state.

In addition, in the second lane and the fifth lane, the cup-shaped containers are sequentially transferred from one short conveyor to another in order to turn over the cup-shaped containers from an upright state to an inverted state. The movement in each lane is similar to that described above.

<Actual Conveyance Aspect of Cup>

The states when the cup-shaped containers are actually conveyed are described below in order (FIG. 1 to FIG. 6) with respect to Embodiment 1. A predetermined content (cup noodle lump) is enclosed in each of the cup-shaped containers that are sequentially carried by the first conveyance device of Embodiment 1 of the present invention. In other words, a product form of instant cup noodles is assumed.

Further, a case where a product of which upper portion has been sealed by a lid is conveyed is assumed. However, as a matter of course, the present invention is not limited to the aspect as above.

In the first conveyance device, the cup-shaped containers in the product form are sequentially conveyed in series in a single string at predetermined intervals. The conveyance speed of those cup-shaped containers is not particularly limited, but is roughly from about 50 meals/minute to about 300 meals/minute. Preferably, the conveyance speed is roughly from about 100 meals/minute to about 250 meals/minute.

Next, in the first conveyance device 1, when the cup-shaped containers C reach the diverging portion to the second conveyance device 3, every six cup-shaped containers are moved from the first conveyance path 11 to the second conveyance paths 30 by an air device 13 that emits air by an air pressure as a pulse.

For example, when the conveyance speed of the cup-shaped containers in the first conveyance device 1 is 150 meals/minute, on the second conveyance paths 30, the cup-shaped containers are preferably moved at a speed of 25 meals/minute on six conveyance paths in the second conveyance device 3.

Out of the second conveyance paths 30, on the second lane and the fifth lane from the top of the paper of FIG. 1, the cup-shaped containers are conveyed while maintaining an upright state and are conveyed in the downstream direction while maintaining the upright state.

Note that the conveyance is performed by belt conveyors, and the conveyance to a place near intermediate portions of the second conveyance paths is performed by the belt conveyors. After the conveyance on the belt conveyors, the slip-torque conveyor 39 is installed, and the cup-shaped containers are transferred toward the slip-torque conveyor 39 at regular intervals. On the slip-torque conveyor, the cup-shaped containers are gradually conveyed in the downstream direction in a retainable state.

Next, in the first lane, the third lane, the fourth lane, and the sixth lane from the top of the paper of FIG. 1, the cup-shaped containers are sequentially transferred from one short conveyor to another in order to turn over the cup-shaped containers from an upright state to an inverted state.

In other words, after conveying the cup-shaped containers on the downslope conveyor 43, the cup-shaped containers are rolled over so that the lateral side portions of the cup-shaped containers are on the lower side, and the lateral side portions of the cup-shaped container are positioned so as to come into contact with the conveyor surface of the upslope conveyor 45. Partition plates 46 are mounted for the upslope conveyor with predetermined intervals, and the cup-shaped containers are carried in a diagonally upward direction while being guided by the partition plates.

At the end portion of the upslope conveyor 45, the cup-shaped containers are rotationally dropped so that the upper surfaces of the cup-shaped containers are on the lower side, the upper surface portions of the cups are positioned so as to come into contact with the conveyor surface, and the cup-shaped containers in an inverted state are conveyed in the horizontal direction.

After a short-distance conveyance in a horizontal state, the cup-shaped containers are transferred toward the slip-torque conveyor 39 at regular intervals in an inverted state. On the slip-torque conveyor 39, the cup-shaped containers are gradually conveyed in the downstream direction in a retainable state.

Now, on the slip-torque conveyor 39, the partition for each lane is removed, the first conveyance lane to the third conveyance lane and the fourth conveyance lane to the sixth conveyance lane including three lanes each are broadly partitioned into a first slip region 57 and a second slip region 59 by partition bars, and conveyance is performed (FIG. 4).

In each slip region, the cup-shaped containers are conveyed while maintaining a state of a combination of inverted, upright, and inverted containers from the right end to the left end in the conveyance direction.

The partition bars 49 that partition each slip region are set so that the intervals therebetween becomes narrower as approaching downstream, and the cup-shaped containers are conveyed in the downstream direction so that gaps between the cup-shaped containers in the width direction gradually decreases and the cup-shaped containers become a bundle.

When the cup-shaped containers approach the terminal end of the conveyance path of the slip-torque conveyor 39, the cup-shaped containers come into close contact with each other so as to be integrated into a bundle of a set of inverted, upright, and inverted containers, and the first shutters 51 intermittently extend to the upper portion in a direction perpendicular to the direction of travel of the slip-torque conveyor 39 at a position behind the terminal end portion of the slip-torque conveyor 39 by one cup.

In addition, the conveyance stoppers 31 are provided on the terminal end portion of the slip-torque conveyor 39. The conveyance stoppers 31 are positioned in a state of extending to the upper portion, and stops the movement of the cup-shaped containers by the slip-torque conveyor 39 by a damming aspect.

Further, because the first shutters 51 extend to the upper portion in the state, a bundle of a set of inverted, upright, and inverted containers is precisely partitioned between the first shutters 51 and the conveyance stoppers 31 provided on the terminal end of the slip-torque conveyor 39.

Further, for the combination of a bundle of inverted, upright, and inverted cup-shaped containers partitioned between the first shutters 51 and the conveyance stoppers 31, a combination state of the bundle of inverted, upright, and inverted cup-shaped containers is completed when the guiding arms 53 that assist the positioning in the width direction from both ends thereof approach the cup-shaped containers from both ends and come into contact with and press the cup-shaped containers.

Similarly, also in the fourth lane to the sixth lane, a combination state of a bundle of inverted, upright, and inverted cup-shaped containers is completed in the region of the slip-torque conveyor 39.

The transportation unit 95 approaches the bundle of the combination of cup-shaped containers and attracts and transports the cup-shaped containers from above. In other words, the transportation unit 95 sucks and lifts the bundle of cup-shaped containers described above in a state of a bundle upward, and transfers the bundle of cup-shaped containers to the third conveyance path.

After sucking the bundle of cup-shaped containers stopped by the conveyance stoppers 31 and raising the bundle of cup-shaped containers, the slider 97 horizontally moves to the lower portion of the third conveyance device. Then, the transfer unit 95 is lowered, the suction of the cup-shaped containers is released in a state in which the cup-shaped containers are placed on the conveyance path 71 of the third conveyance device 7, and the bundle of (three) cup-shaped containers is transferred to the third conveyance device.

An aluminum cap is mounted on the upper surface of the cup-shaped container by sealing, which is flat and can be sucked. In addition, there is a flat bottom portion on the bottom surface. Therefore, the cup-shaped container is easily sucked by the transportation unit 95.

The third conveyance path 71 is disposed so as to be parallel to the first conveyance path 11, and is configured to convey the bundle of the combination of cup-shaped containers described above sequentially and continuously in a single string.

In the third conveyance path 71, a combination of a bundle of inverted, upright, and inverted cup-shaped containers is sequentially transferred, and continuously conveyed.

By the continuous conveyance, in the third conveyance device 7, the set of cup-shaped containers that is a bundle of a set of inverted, upright, and inverted containers is sequentially conveyed at predetermined intervals.

Although not shown in the drawings of the description of the present application, for example, "a package of the cup-shaped containers" including three combinations of a bundle of inverted, upright, and inverted containers can be prepared by provision of a lateral pillow packaging machine that performs packaging while maintaining the state of the bundle of inverted, upright, and inverted containers in a downstream region after the conveyance of the third conveyance device 7.

In addition, not only the lateral pillow packaging can be performed. When the cup-shaped containers C are sequentially filled into containers, such as boxes, in the state of the bundle, the filling of the cup-shaped container C can be performed with relatively less gaps. Therefore, the packaging and the like thereafter can be performed while reducing the waste of packing materials.

As a matter of course, various processing can be selected as the aspect of the third conveyance device 7 after the conveyance.

The invention claimed is:

1. A cup-shaped container conveyance device for conveying a plurality of cup-shaped containers, the cup-shaped container conveyance device comprising:
    a first conveyance device comprising a conveyance path configured to continuously convey the cup-shaped containers having a predetermined shape;
    a second conveyance device comprising a plurality of conveyance paths diverging from the conveyance path of the first conveyance device, the plurality of conveyance paths being arranged in a side-by-side manner;
    a conveyance stopper provided in a terminal end of each of the plurality of the conveyance paths of the second conveyance device;
    a transfer device comprising a holding member configured to hold a predetermined number of the cup-shaped containers stopped by the conveyance stopper of each of the plurality of the conveyance paths of the second conveyance device, the transfer device being configured to move the holding member so as to transfer the predetermined number of the cup-shaped containers as a bundle; and
    a third conveyance device comprising a conveyance path configured to convey the predetermined number of cup-shaped containers transferred as the bundle in a single string,
    wherein the second conveyance device comprises an upstream area and a downstream area, and
    a partition is provided for each of a predetermined number of the conveyance paths in the upstream area, but the partition is not provided in the downstream area.

2. The cup-shaped container conveyance device according to claim 1, further comprising a turning over device configured to turn over the cup-shaped containers on a predetermined conveyance path out of the plurality of conveyance paths of the second conveyance device.

3. The cup-shaped container conveyance device according to claim 1, wherein the predetermined number of the cup-shaped containers transferred as the bundle are arranged such that an upright container and an inverted container alternate in arrangement of the cup-shaped containers adjacent to each other.

4. The cup-shaped container conveyance device according to claim 1, further comprising a shutter mechanism comprising a shutter that is provided at a predetermined position on an upstream side relative to the conveyance stopper and is capable of ascending and descending for defining positions of the cup-shaped containers in each of the plurality of the conveyance paths in the second conveyance device.

5. The cup-shaped container conveyance device according to claim 1, further comprising a packaging device configured to wrap with a film the predetermined number of the cup-shaped containers so as to package the predetermined number of the cup-shaped containers as the bundle on a downstream side relative to the third conveyance device.

6. The cup-shaped container conveyance device according to claim 2,
wherein the turning over device comprises a plurality of belt conveyors, and
the cup-shaped containers on the predetermined conveyance path are transferred from one of the plurality of the belt conveyors to another thereof so as to be turned over.

7. A cup-shaped container conveyance device for conveying a plurality of cup-shaped containers, the cup-shaped container conveyance device comprising:
a first conveyance device comprising a conveyance path configured to continuously convey the cup-shaped containers having a predetermined shape;
a second conveyance device comprising a plurality of conveyance paths diverging from the conveyance path of the first conveyance device, the plurality of conveyance paths being arranged in a side-by-side manner;
a conveyance stopper provided in a terminal end of each of the plurality of the conveyance paths of the second conveyance device;
a transfer device comprising a pushing member configured to push and transfer a predetermined number of the cup-shaped containers stopped by the conveyance stopper of each of the plurality of the conveyance paths of the second conveyance device as a bundle; and
a third conveyance device comprising a conveyance path configured to convey the predetermined number of cup-shaped containers transferred as the bundle in a single string,
wherein the second conveyance device comprises an upstream area and a downstream area, and
a partition is provided for each of a predetermined number of the conveyance paths in the upstream area, but the partition is not provided in the downstream area.

8. The cup-shaped container conveyance device according to claim 7, further comprising a turning over device configured to turn over the cup-shaped containers on a predetermined conveyance path out of the plurality of the conveyance paths of the second conveyance device.

9. The cup-shaped container conveyance device according to claim 7, wherein the predetermined number of the cup-shaped containers transferred as the bundle are arranged such that an upright container and an inverted container alternate in arrangement of the cup-shaped containers adjacent to each other.

10. The cup-shaped container conveyance device according to claim 7, further comprising a shutter mechanism comprising a shutter that is provided at a predetermined position on an upstream side relative to the conveyance stopper and is capable of ascending and descending for defining positions of the cup-shaped containers in each of the plurality of the conveyance paths in the second conveyance device.

11. The cup-shaped container conveyance device according to claim 7, further comprising a packaging device configured to wrap with a film the predetermined number of the cup-shaped containers so as to package the predetermined number of the cup-shaped containers as the bundle, on a downstream side relative to the third conveyance device.

12. The cup-shaped container conveyance device according to claim 8,
wherein the turning over device comprises a plurality of belt conveyors, and
the cup-shaped containers on the predetermined conveyance path are transferred from one of the plurality of the belt conveyors to another thereof so as to be turned over.

* * * * *